United States Patent
Bose et al.

(10) Patent No.: US 8,271,809 B2
(45) Date of Patent: Sep. 18, 2012

(54) ON-CHIP POWER PROXY BASED ARCHITECTURE

(75) Inventors: Pradip Bose, Yorktown Heights, NY (US); Alper Buyuktosunoglu, White Plains, NY (US); Michael Stephen Floyd, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 12/424,161

(22) Filed: Apr. 15, 2009

(65) Prior Publication Data

US 2010/0268975 A1 Oct. 21, 2010

(51) Int. Cl.
*G06F 1/26* (2006.01)
*G06F 1/28* (2006.01)
*G06F 1/32* (2006.01)

(52) U.S. Cl. ........ 713/300; 713/310; 713/320; 713/321; 713/322; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 5,719,800 A * | 2/1998 | Mittal et al. ................. | 713/321 |
| 5,812,860 A | 9/1998 | Horden et al. | |
| 5,918,061 A | 6/1999 | Nikjou | |
| 6,345,363 B1 | 2/2002 | Levy-Kendler | |
| 6,738,675 B2 | 5/2004 | Dai | |
| 7,020,789 B2 | 3/2006 | Sperber et al. | |
| 7,051,300 B1 * | 5/2006 | Shen et al. ................... | 716/104 |
| 7,174,469 B2 | 2/2007 | Luick | |
| 7,188,262 B2 | 3/2007 | Arends et al. | |
| 7,232,531 B2 | 6/2007 | Cupps et al. | |
| 7,249,268 B2 | 7/2007 | Bhandarkar | |
| 7,337,334 B2 | 2/2008 | Kuhlmann et al. | |
| 7,337,339 B1 | 2/2008 | Choquette et al. | |
| 7,389,403 B1 | 6/2008 | Alpert et al. | |
| 7,406,610 B2 | 7/2008 | Kardach et al. | |
| 7,529,907 B2 | 5/2009 | Nemirovsky et al. | |
| 7,610,537 B2 | 10/2009 | Dickinson et al. | |
| 2006/0090086 A1 * | 4/2006 | Rotem et al. .................. | 713/300 |
| 2006/0288241 A1 * | 12/2006 | Felter et al. .................. | 713/300 |
| 2007/0150895 A1 | 6/2007 | Kurland | |
| 2008/0222400 A1 | 9/2008 | Becker et al. | |
| 2008/0307422 A1 | 12/2008 | Kurland et al. | |
| 2009/0138737 A1 | 5/2009 | Kim et al. | |

(Continued)

OTHER PUBLICATIONS

U.S. Appl. No. 12/749,179, filed Mar. 29, 2010, Bose et al.

(Continued)

*Primary Examiner* — Fahmida Rahman
(74) *Attorney, Agent, or Firm* — Yee & Associates, P.C.

(57) ABSTRACT

Illustrative embodiments estimate power consumption within a multi-core microprocessor chip. An authorized user selects a set of activities to be monitored. A value for each activity of the set of activities is stored in a separate counter of a set of counters, forming a set of stored values. The value comprises the count multiplied by a weight factor specific to the activity. The set of activities are grouped into subsets. The stored values corresponding to each activity in each subset are summed, forming a total value for each subset. The total value of each subset is multiplied by a factor corresponding to the subset, forming a scaled value for each subset. The scaled value of each subset is summed, forming a power usage value. A power manager adjusts the operational parameters of the unit based on a comparison of the power usage value to a threshold value.

20 Claims, 8 Drawing Sheets

U.S. PATENT DOCUMENTS

2010/0268974 A1* 10/2010 Floyd et al. .................. 713/340

OTHER PUBLICATIONS

Weinsberg et al., "Tapping into the Fountain of CPUs—On Operating System Support for Programmable Devices", ASPLOS'08, Mar. 2008, Seattle, Washington, pp. 179-189.

Strozek et al., "Efficient Architectures through Application Clustering and Architectural Heterogeneity", CASES'06, Oct. 2006, Seoul Korea, pp. 190-201.

Hadzic et al., "Balancing Performance and Flexibility with Hardware Support for Network Architectures", ACM Transactions on Comptuter Systems, vol. 21, No. 4, Nov. 2003, pp. 375-411.

U.S. Appl. No. 12/043,168, filed Mar. 6, 2008, Becker et al.

* cited by examiner

ON-CHIP POWER PROXY BASED ARCHITECTURE

This invention was made with United States Government support under Agreement No. HR0011-07-9-0002 awarded by DARPA. THE GOVERNMENT HAS CERTAIN RIGHTS IN THE INVENTION.

BACKGROUND

1. Field of the Invention

The present application relates generally to microprocessors. More specifically, the present application provides for estimating power consumption within a multi-core microprocessor chip.

2. Description of the Related Art

As multi-core processors become more commonplace, power management issues become more important. Multi-core processors refer to a central processing unit that includes multiple complete execution cores per physical processor. The central processing unit combines multiple processors and their caches and cache controllers onto a single integrated circuit (silicon chip). Multi-core processors are well suited for multi-tasking environments because there are multiple complete execution cores instead of one, each with an independent interface to the front side bus. Since each core has its own cache, the operating system has sufficient resources to handle most compute intensive tasks in parallel.

Effective power management in a microprocessor requires measurement or approximation of power. However, the measurement of real, calibrated power consumption in hardware is a difficult and complex task which might involve stalling the processor for proper calibration.

SUMMARY

According to one embodiment of the present invention, a set of activities to be monitored for a unit is received from an authorized user. A value for each activity of the set of activities is stored in a separate counter of a set of counters, forming a set of stored values, wherein the value comprises the count multiplied by a weight factor specific to the activity. The set of activities are grouped into subsets. The stored values corresponding to each activity in each subset are summed to reach a total value for each subset. The total value of each subset is multiplied by a factor corresponding to the subset to form a scaled value for each subset. A power manager receives a power usage value comprising a summation of the scaled value of each subset. The power manager adjusts the operational parameters of the unit based on a comparison of the power usage value to a threshold value.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
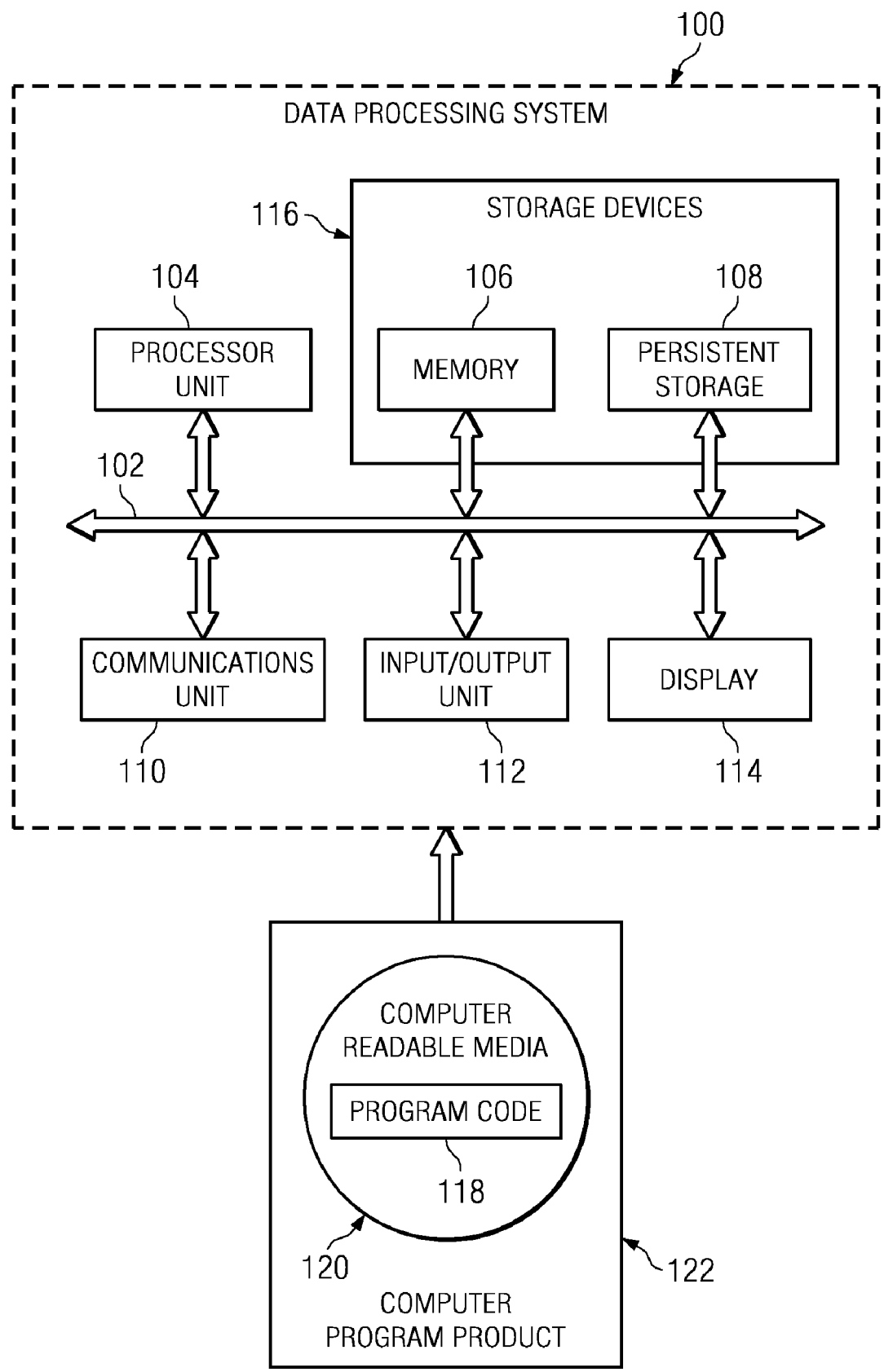
FIG. 1 depicts a block diagram of a data processing system in accordance with an illustrative embodiment of the present invention.

FIG. 1, a block diagram of a data processing system is shown in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
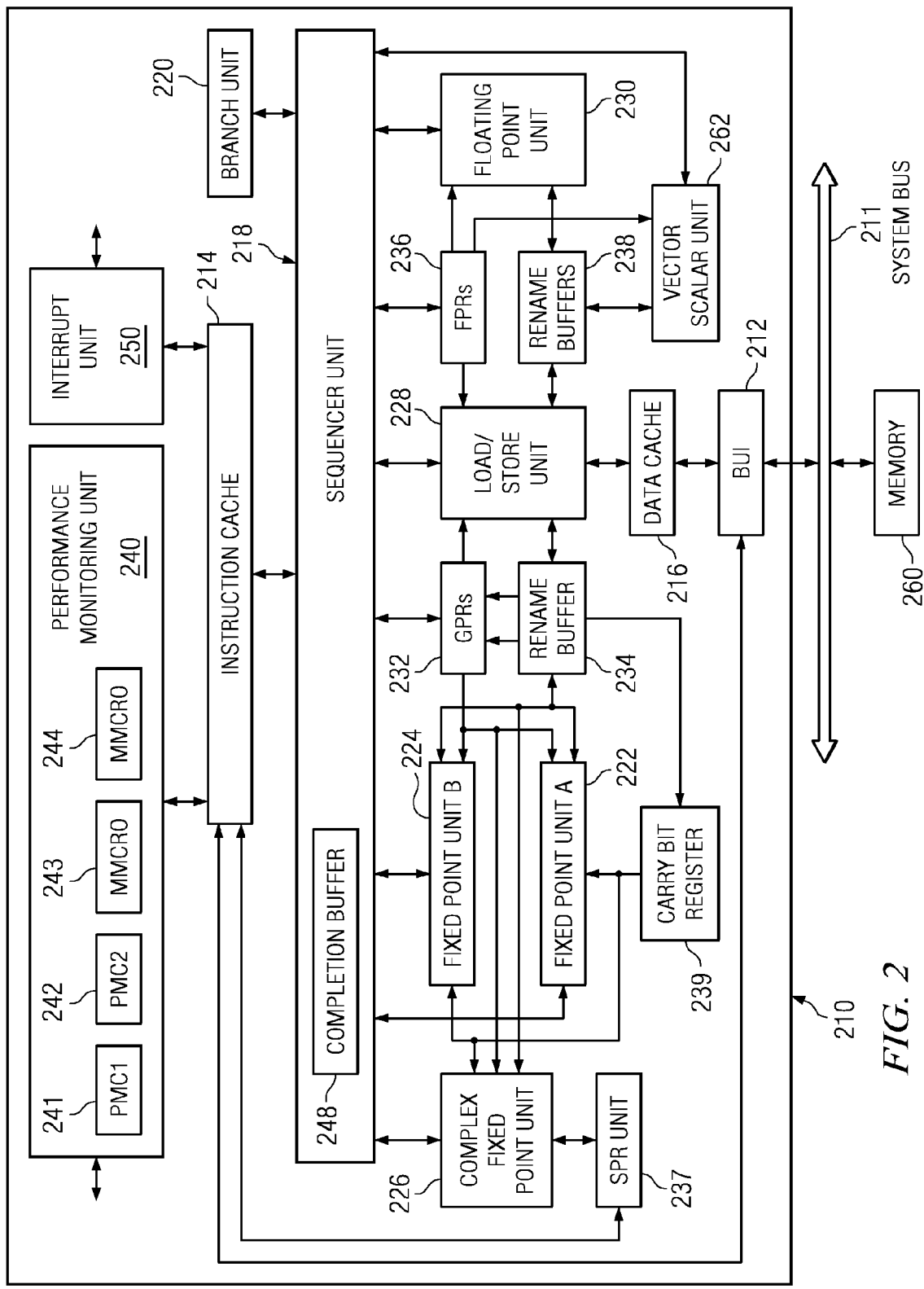
FIG. 2, a block diagram of a processor system for processing information, is depicted in accordance with a preferred embodiment of the present invention.

Turning next to FIG. 2, a block diagram of a processor system for processing information is depicted in accordance with a preferred embodiment of the present invention. Processor 210 may be implemented as processor unit 104 in FIG. 1.

In an illustrative embodiment, processor 210 is a single integrated circuit superscalar microprocessor. Accordingly, as discussed further herein below, processor 210 includes various units, registers, buffers, memories, and other sections, all of which are formed by integrated circuitry. In addition, in an illustrative embodiment, processor 210 operates according to reduced instruction set computer ("RISC") techniques. As shown in FIG. 2, system bus 211 connects to bus interface unit ("BIU") 212 of processor 210. BIU 212 controls the transfer of information between processor 210 and system bus 211.

BIU 212 connects to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in an illustrative embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, a vector scalar unit (VSU) 262, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. In addition, CFXU 226 inputs and outputs source operand information and destination operand information to and from special-purpose register processing unit ("SPR unit") 237.

FPU 230 and VSU 262 input their source operand information from floating-point architectural registers ("FPRs")

236 and floating-point rename buffers 238. FPU 230 and VSU 262 output results (destination operand information) of their operation for storage at selected entries in floating-point rename buffers 238.

In response to a load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 causes instruction fetch unit 240 to fetch the indicated sequence of instructions from instruction cache 214. In some illustrative examples, instruction fetch unit 240 can comprise performance monitor counter (PMC1) 1 241, performance monitor counter (PMC2) 242, monitor mode control register (MMCRO) 243, and monitor mode control register (MMCRO) 244 and can be referred to as performance monitoring unit 240. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

Information stored at a selected one of fixed-point rename buffers 234 is associated with a storage location (e.g. one of GPRs 232 or carry bit (CA) register 239) as specified by the instruction for which the selected rename buffer is allocated. Information stored at a selected one of fixed-point rename buffers 234 is copied to its associated one of GPRs 232 (or CA register 239) in response to signals from sequencer unit 218. Sequencer unit 218 directs such copying of information stored at a selected one of fixed-point rename buffers 234 in response to "completing" the instruction that generated the information. Such copying is called "writeback."

As information is stored at a selected one of floating-point rename buffers 238, such information is associated with one of FPRs 236. Information stored at a selected one of floating-point rename buffers 238 is copied to its associated one of FPRs 236 in response to signals from sequencer unit 218. Sequencer unit 218 directs such copying of information stored at a selected one of floating-point rename buffers 238 in response to "completing" the instruction that generated the information.

Completion buffer 248 is provided within sequencer unit 218 to track the completion of the multiple instructions, which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

Additionally, processor 210 includes interrupt unit 250. Interrupt unit 250 connects to instruction cache 214. Additionally, although not shown in FIG. 2, interrupt unit 250 connects to other functional units within processor 210, including sequencer unit 218. Interrupt unit 250 may receive signals from other functional units and initiate an action, such as starting an error handling or trap process. In these examples, interrupt unit 250 generates interrupts and exceptions that may occur during execution of a program. Interrupt unit 250 includes timer 252.

Additionally, processor 210 includes JTAG port 254, which connects to an external service element, which is not shown. Latches comprise every element of processor 210. JTAG port 254 connects to all the latches that comprise the elements of processor 210.

Currently, in multi-core microprocessors, such as processor 104 of FIG. 1, there is no way to predict active power usage. A user can only measure the temperature of a processor core after the power has been used to approximate how much power was used. Illustrative embodiments provide for forming an estimate of per-chiplet power consumption within a multi-core microprocessor chip by using a specially-architected, weighted counter-based architecture that monitors specific activities and forms an aggregate value. In an illustrative embodiment, the activity counted comprises events such as instructions dispatched, instructions completed, execution regfile access, execution pipe issue types, instruction fetch unit activity, load-store unit cache activity, load-store unit DERAT activity, load-store unit prefetch activities, L2 cache reads and writes, and L3 cache reads and writes. These counted events are multiplied by specifically architected weights and are added to form power proxy values. This approximated value is then used to adjust the operational parameters, such as frequency, voltage, or some other operational parameter or mode, of the chip in order to maintain a power usage goal.

Illustrative embodiments account for transistors that switch in a processor core so that activities can be approximated to calculate power. Illustrative embodiments approximate the power of core, L2 cache and L3 cache combination using digital counters on the chip. Activity event counters in the core, L2 cache, and L3 cache count specific activities. Each counted activity has a specific associated power use weight factor that relates to the power differential. Every time an activity happens a value equal to the power use weight factor associated with the activity is added to a counter for the activity. An activity can happen multiple times in one cycle, thus the value would be added to the counter multiple times in the one cycle. By selectively weighting the different events relative to one another based on power modeling and empirical correlation work, the amount of power consumed by the chip can be approximated.

The counters for the various activities are located in one location, the power proxy unit, on the processor core. A multi-core microprocessor chip comprises chiplets, wherein a chiplet is a processor core plus some memory cache, such as an L2, L3, or L4 memory cache or some combination thereof. A multi-core microprocessor chip may also include some specialized units such as crypto or decompression assist units. These units are independently controllable units that can have their operational parameters or modes, such as frequency or voltage or other parameter changed based on the power proxy values. In one illustrative embodiment, a processor core is divided into physical regions and a power manager comprising power management firmware tracks power consumption on a per region basis.

In another illustrative embodiment, the power manager monitors how often an activity happens and what types or activities are issued up pipeline in order to estimate power usage downstream. The power manager is external to the processor and may be located on the microprocessor as the cores being monitored. In another illustrative embodiment, the power manager is located on a dedicated micro controller.

Figure 3:
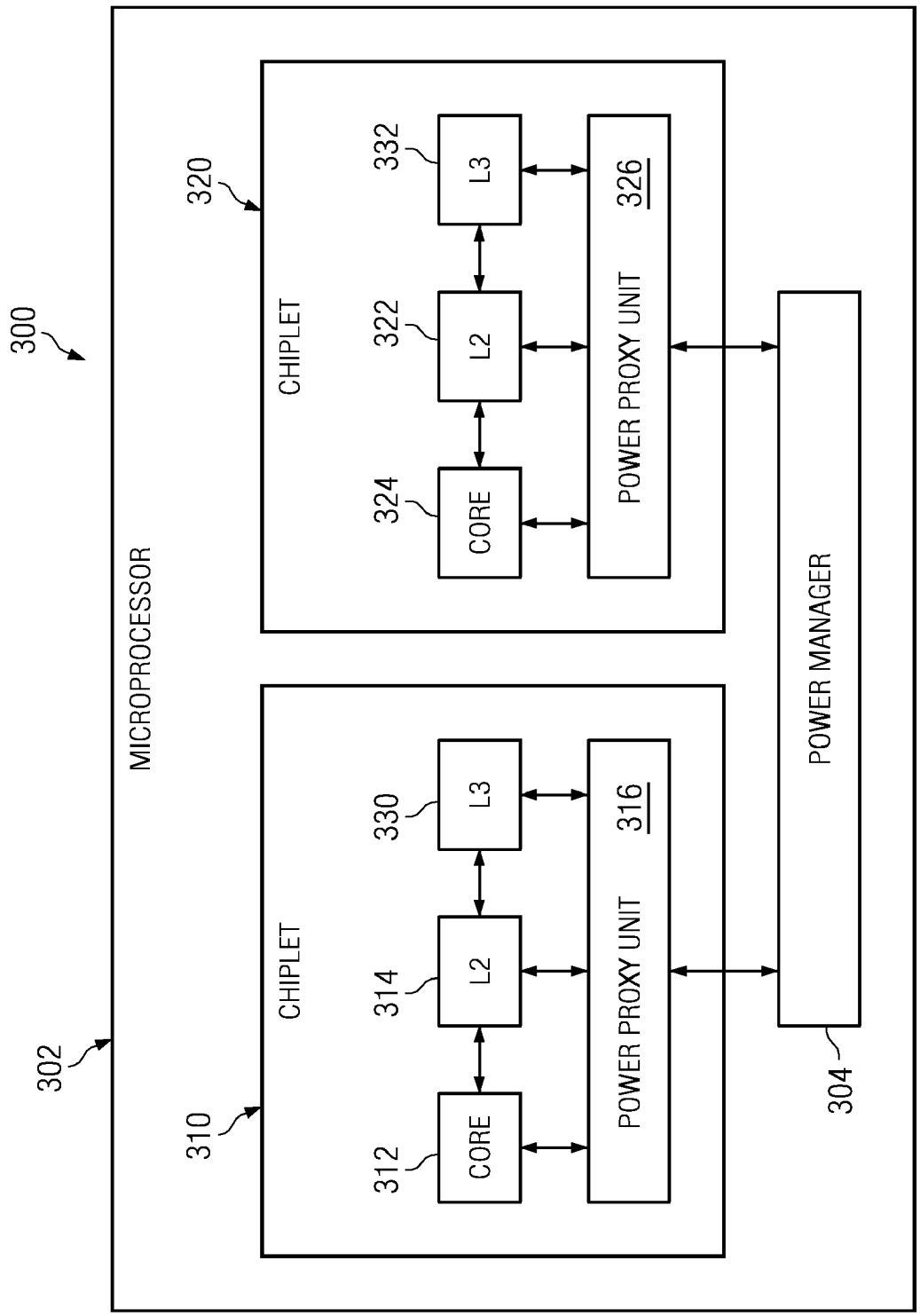
FIG. 3 is a block diagram of a system wherein microarchitecture for estimating of per-chiplet power consumption within a multi-core microprocessor chip may be implemented in accordance with an illustrative embodiment.

FIG. 3 is a block diagram of a system wherein microarchitecture for estimating of per-chiplet power consumption within a multi-core microprocessor chip may be implemented in accordance with an illustrative embodiment. In computer engineering, microarchitecture (sometimes abbreviated to μarch or uarch) is a description of the electrical circuitry of a computer, central processing unit, or digital signal processor that is sufficient for completely describing the operation of the hardware. Thus, system 300 depicts a system for estimating of per-chiplet power consumption within a multi-core microprocessor chip on a microarchitectural level.

System 300 comprises microprocessor 302 and power manager 304. Microprocessor 302 may be implemented as processor 210 in FIG. 2. Power manager 304 is a global, system-level power management controller. In an alternative embodiment, power manager 304 is a separate dedicated micro controller.

Microprocessor 302 comprises power manager 304 and chiplets 310 and 320. Chiplet 310 comprises core 312, L2 cache 314, L3 cache 330, and power proxy unit 316. Chiplet 320 comprises core 324, L2 cache 322, L3 cache 332, and power proxy unit 326. While FIG. 3 shows microprocessor 302 as comprising two (2) chiplets, alternate illustrative embodiments contemplate microprocessor 302 comprising any number of chiplets, from one to several. While not shown in FIG. 3, microprocessor core 302 may comprise additional specialized units, such as crypto or decompression assist units, which communicate with a power proxy unit, such as power proxy unit 316, which reports to power manager 304.

Power proxy units 316 and 326 monitor a set of counters. Whenever an activity specified to be monitored occurs, a value equal to a power usage weight associated with the activity is added to a counter. The counter is associated with one activity only. Then, periodically, the values held in the set of counters monitored by power proxy units 316 and 326 are collected by power proxy units 316 and 326. Power proxy units 316 and 326 each add these collected values together to arrive at a power usage estimate for the unit monitored by each of power proxy units 316 and 326. A unit may be a chiplet, a thread, or a specialized unit such as a crypto or decompression assist engine. These power usage estimates are sent to power manager 304. Power manager 304 compares the power usage estimates to a predetermined threshold and adjusts the operational parameters of the each unit based on the comparison, in order to achieve the power usage goals. A power usage goal could be a specific power usage cap. Based on the estimate, if the power usage is not being exceeded, the system can be sped up, that is, the frequency can be increased. If the power usage estimate exceeds the cap, then the system can be slowed down. Thus, the power manager is self-learning based on the power signature. The frequency at which the data is collected is typically a number of milliseconds as opposed to a number of cycles.

Each power proxy unit manages a set of counters. The power proxy unit collects the stored values for the set of counters the power proxy unit manages in parallel. Further, a single power manager manages a plurality of power proxy units. Each power proxy has one or more units assigned that the power proxy unit monitors. The power proxy units may then collect values in parallel or independently of each other. Further the collection period is configurable for each power proxy unit and each power proxy unit may collect the stored values for different periods than every other power proxy managed by a power manager.

Power manager 304 and power proxy units 316 and 326 have memory and a programmable interface that allows a user to specifically assign what specific counters will count what specific activities as well as assigning the weight to the activity.

Illustrative embodiments track activity metrics on a per-chiplet basis. In another illustrative embodiment, the metrics are tracked on a per thread basis. Activity counters track activities in a core, in an L2 cache, and in an L3 cache, and reset once read by the power manager.

Counts for each of these activities are counted in a counter. The individual counts are then multiplied by a weight factor specific to that particular activity to reach a value and that value is stored in an activity counter. A weight can be any value other than zero. In an illustrative embodiment the weight factor comprises four bits. In other illustrative embodiments the weight factor can be comprised of any number of bits.

Figure 4:
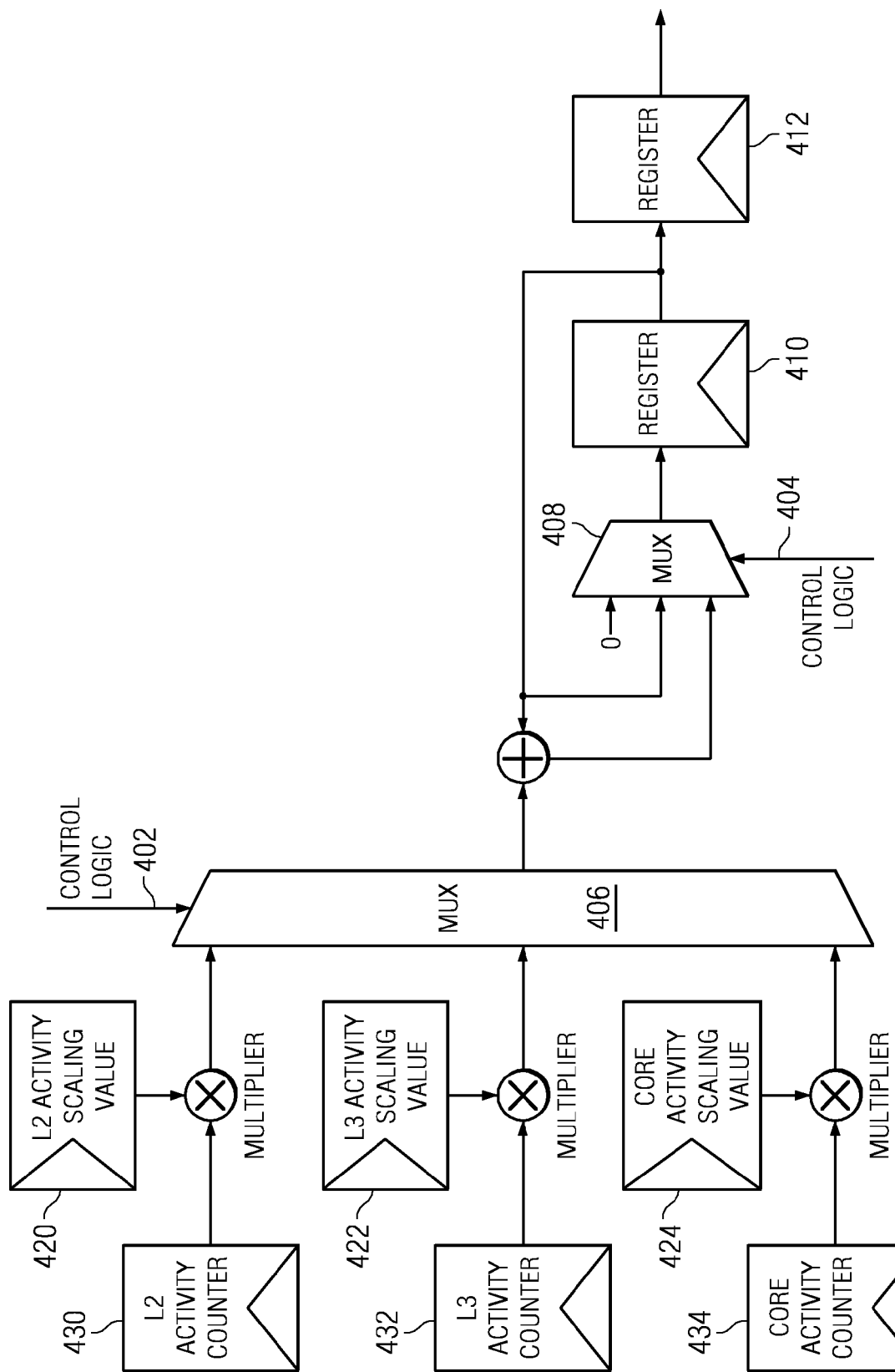
FIG. 4 is a block diagram of a power proxy unit in accordance with an illustrative embodiment.

FIG. 4 is a block diagram of a power proxy unit in accordance with an illustrative embodiment. FIG. 4 may be implemented as power proxy unit 316 in FIG. 3. When received by a power proxy unit, the values in the L2, L3, and core activity counters are multiplied by a scaling factor associated with the L2 activity counter 430, L3 activity counter 432 or core activity counter 434 accordingly. Typically, one of these scaling values, L2 activity scaling value 420, L3 activity scaling value 422, or core activity scaling value 424, will be one. These adjusted values are received by MUX 406. MUX 406 and 408 are implemented in hardware. Control logic 402, from a finite state machine (not shown) of the power proxy unit, determines which adjusted value, the adjusted L2 activity value, the adjusted L3 activity value, or the adjusted core activity value is selected to be summed by the power proxy unit. At MUX 408, control logic 404, from a finite state machine (not shown) of the power proxy unit, determines what value is to be added to register 410, either zero, or the value already in register 410, or the adjusted activity value selected by control logic 402. Once register 410 overflows, the value in register 410 is added to the value in register 412. The value in register 412 is collected periodically by a power manager, such as power manager 304 in FIG. 3.

Figure 5:
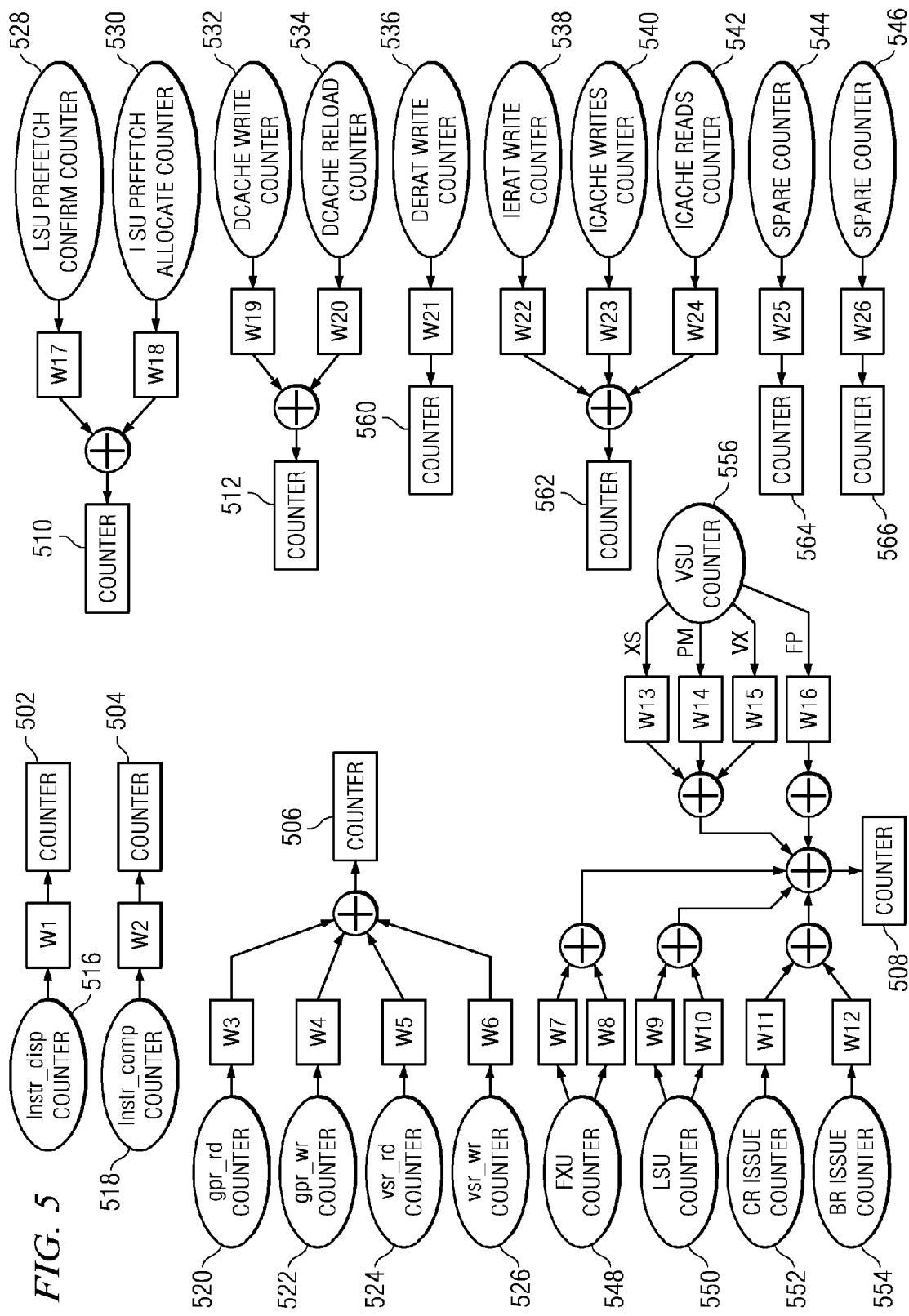
FIG. 5 is a block diagram illustrating an example of core activity counting, in accordance with an illustrative embodiment.

FIG. 5 is a block diagram illustrating an example of core activity counting, in accordance with an illustrative embodiment. The activities illustrated in FIG. 5 are examples of activities to be counted and eventually stored as a value in the core activity counter 434 of FIG. 4. Counters 502-556 and 560-566 are counters in a power proxy unit, such as power proxy unit 316 of FIG. 3. In another illustrative embodiment, before being stored in counters, such as counters 516-526, values may be divided by a certain value. Weights W1-W26 are weights associated with the activities being counted. In an illustrative embodiment, weights W1-W26 are four (4) bit values.

Instr_disp counter 516 counts instructions dispatched and instr_comp counter 518 counts instructions completed. The count in instr_disp counter 516 is multiplied by weight W1 and then this total value is stored in counter 502. The count in instr_comp counter 518 is multiplied by weight W2 and then this total value is stored in counter 504.

Gpr_rd counter 520 counts general purpose register reads (gpr_rd), gpr_wr counter 522 counts general purpose register writes (gpr_wr), vsr_rd counter 524 counts vector register file reads (vsr_rd), and vsr_wr counter 526 counts vector register file writes (vsr_wr). The count in gpr_rd counter 520 is multiplied by weight W3 and then this total value is summed with the total value of the count in gpr_wr counter 522 multiplied by weight W4 and the total value of the count in vsr_rd counter 524 multiplied by weight W5 and the total value of the count in vsr_wr counter 526 multiplied by weight W6 stored in counter 506.

LSU prefetch confirm counter 528 stores a count of LSU prefetches confirmed. LSU prefetch allocate counter 530 stores a count of LSU prefetches allocated. Counter 510 stores a value equal to the count in LSU prefetch confirm counter 528 multiplied by weight W17 summed with the count from LSU prefetch allocate counter 530 multiplied by weight W18. Counter 560 stores a value equal to the count in DERAT write counter 536 multiplied by weight W21.

Dcache write counter 532 stores a count of data cache writes. Dcache reload counter 534 stores a count of data cache reloads. Counter 512 stores a value equal to the sum of the count in Dcache write counter 532 multiplied by weight W19 and the count in Dcache reload counter 534 multiplied by weight W20.

Icache writes counter 540 stores count of instruction cache writes. Icache reads counter 542 stores a count of instruction cache reads. IERAT write counter 538 stores a count of IERAT writes. Counter 562 stores a value equal to the sum of the count in IERAT write counter 538 multiplied by weight W22, the count in Icache writes counter 540 multiplied by weight W23, and the count in Icache reads counter 542 multiplied by weight W24.

FXU counter 548 stores a count of various instructions issued to an FXU unit, such as FXU 222 of FIG. 2. The count of these instructions are multiplied by a corresponding weight, such as weight W7 and W8, forming adjusted values. The adjusted values are summed together with the adjusted values from the other counters and stored in counter 508. For example, weight W7 may correspond to instructions to multiply while weight W8 may correspond to instructions to divide. LSU counter 550 stores a count of load instructions issued plus a count of store instructions issued. The count of load instructions issued is multiplied by a weight W9 and the count of store instructions issued is multiplied by a weight of W10, forming adjusted values. The adjusted values are summed together with the adjusted values from the other counters and stored in counter 508. CR issue counter 552 stores a count of control register instruction issued. The count of control register instruction issued is multiplied by a weight W11, forming an adjusted value. The adjusted value is summed together with the adjusted values from the other counters and stored in counter 508. BR issue counter 554 stores a count of branch instructions issued. The count of branch instructions issued is multiplied by a weight W12, forming an adjusted value. The adjusted value is summed together with the adjusted values from the other counters and stored in counter 508.

VSU counter 556 stores a count of activities, which includes activities performed by both VSU 262 and FPU 230 of FIG. 2, only some of which are shown in FIG. 5. In the present example, VSU counter 556 stores a count equal to a sum of the count of permutation (PM) operations plus a count of floating point (FP) operations plus a count of simple vector (XS) operations plus a count of complex vector (VX) operations. The count of the various operations are multiplied by a corresponding weight, weight W13-16, summed together and then summed with the adjusted values from the other counters and stored in counter 508.

Spare counters 544 and 546 represent additional activities that could be assigned a weight, W25 and W26, and tracked, depending upon a determination made by an authorized user, such as a designer. Counters 502-512 and 560-566 are summed together and stored in core activity counter 434 in FIG. 4.

Figure 6:
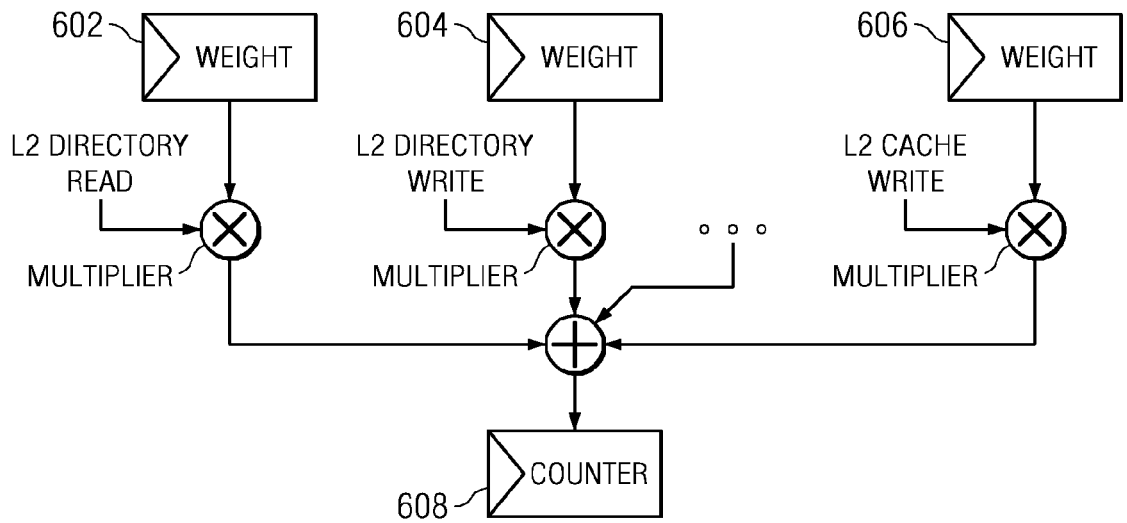
FIG. 6 is a block diagram illustrating an example of L2 cache activity counting, in accordance with an illustrative embodiment.

FIG. 6 is a block diagram illustrating an example of L2 cache activity counting, in accordance with an illustrative embodiment. While FIG. 6 shows L2 directory reads, L2 directory writes, and L2 cache writes as activities being counted and monitored, other activities including L2 cache targeted reads and L2 cache full reads could be counted and monitored. Further, while FIG. 6 shows L2 cache activities being counted, the process illustrated in FIG. 6 applies to L3 cache activities as well. Counter 608 comprises the sum of a count of L2 directory read operations multiplied by weight 602 plus a count of L2 directory write operations multiplied by weight 604 plus a count of L2 cache write operations multiplied by weight 606. Counter 608 is stored in L2 activity counter 430 of FIG. 4. Periodically, the value of counter 608 is collected by a power manager, such as power manager 304 of FIG. 3.

Figure 7:
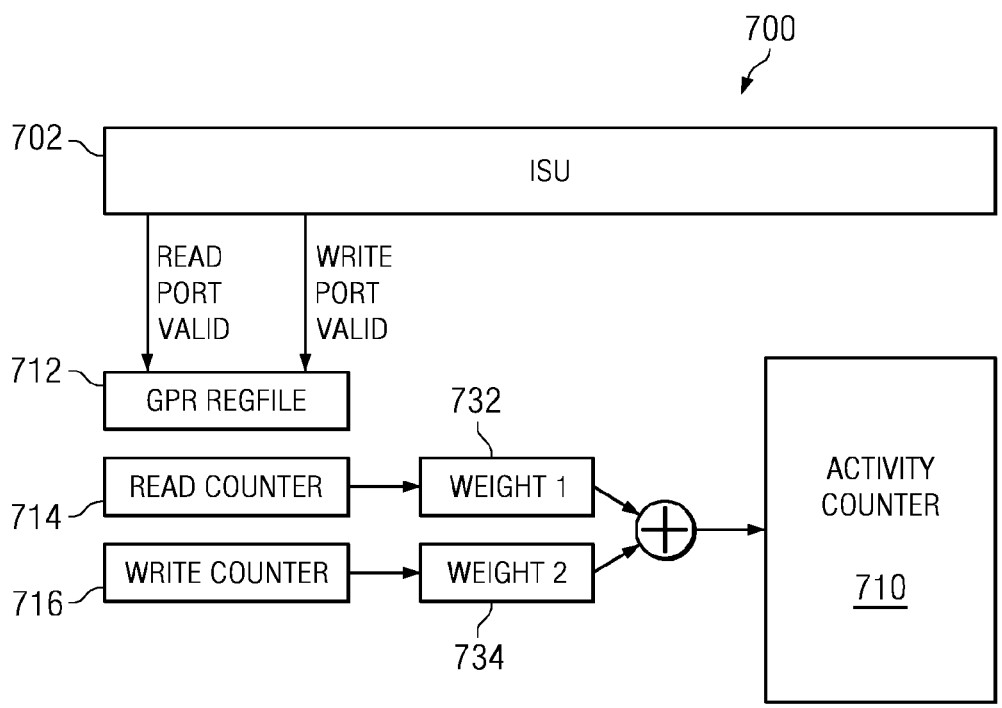
FIG. 7 is a block diagram of a system for performing execution regfile activity counts in accordance with an illustrative embodiment.

FIG. 7 is a block diagram of a system for performing execution regfile activity counts in accordance with an illustrative embodiment. System 700 comprises ISU 702, gpr regfile 712, read counter 714, write counter 716, and activity counter 710. ISU 702 is an instruction sequencer unit which may be implemented as sequencer unit 218 of FIG. 2.

Whenever ISU 702 issues a valid read access request for gpr regfile 712, read counter 714 is incremented atomically, that is by one. Whenever ISU 702 issues a valid write access request for gpr regfile 712, write counter 716 is incremented atomically. The count in read counter 714 is multiplied weight 1 732 to arrive at a value. This value is summed with the value of write counter 716 multiplied by weight 2 734 and stored in counter 710, which is part of a power proxy unit, such as power proxy unit 316 of FIG. 3. These weight factors are determined through pre-silicon and after silicon power modeling and are assigned by an authorized user through a power management unit, such as power manager 304 of FIG. 3.

Furthermore, the values for all the counters monitored by a power proxy unit are collected in parallel. The counter 710 is reset when the values in counter 710 is sent to a power manager, such as power manager 304 of FIG. 3, which then adjusts the operational parameters of the unit being monitored, such as a core or a thread, in order to achieve the power management goals, such as maintaining a certain temperature or a certain power usage level.

While FIG. 7 shows counting execution regfile activity on per core basis, in another illustrative embodiment, execution regfile activity is tracked on a per thread basis, using the thread identifier. In such a case, read and write activities for each thread are tracked using separate counters, which then send their counts to separate activity counters where counts would be multiplied by the appropriate weight factor and the total value stored in the activity counter.

It should be understood that execution regfile activity is one type of activity that may be counted and the process illustrated in the example of FIG. 7 applies to all the types of activities to be monitored.

Figure 8:
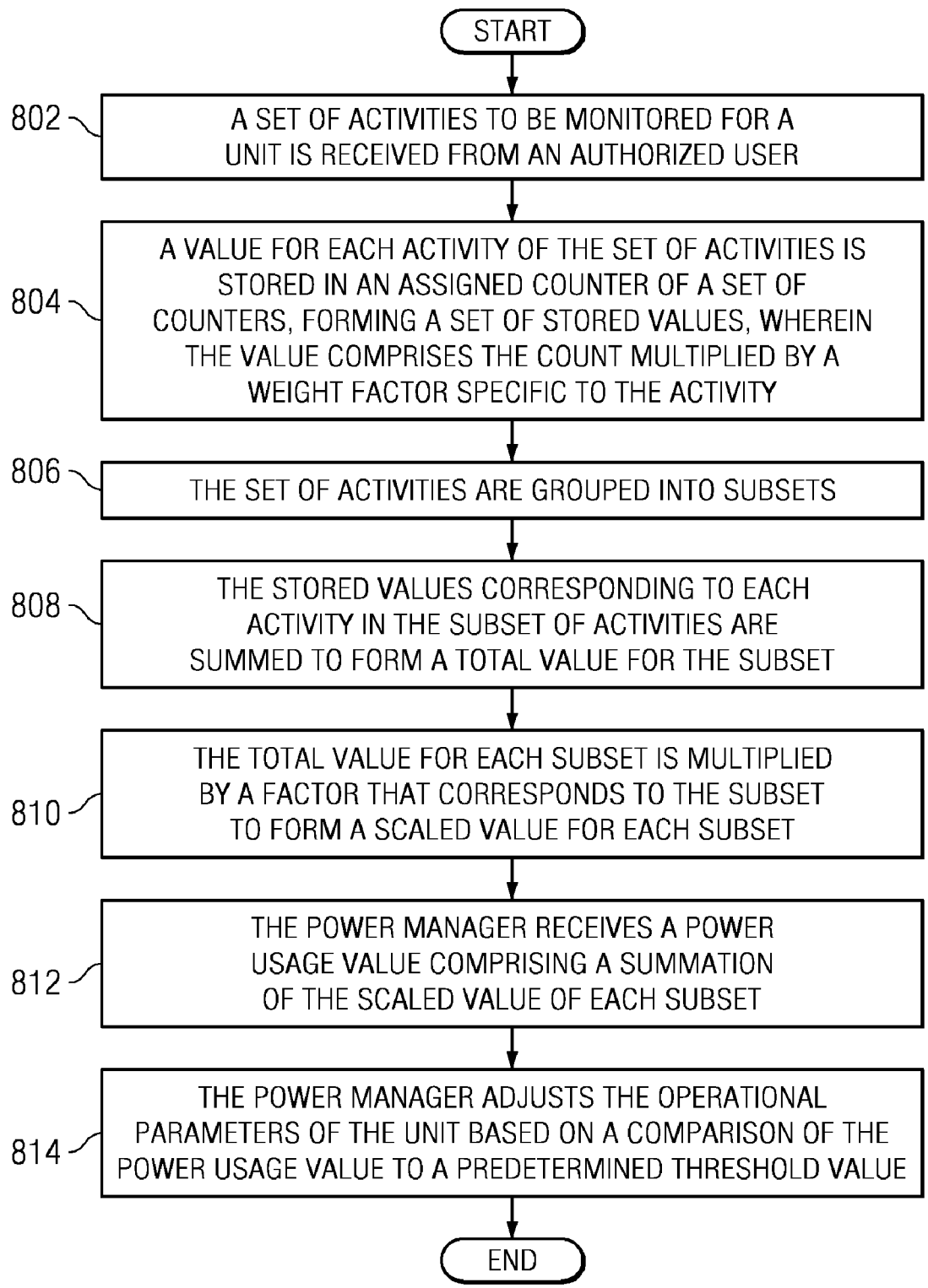
FIG. 8 is a flowchart illustrating the operation of estimating power consumption within a multi-core microprocessor chip at a high level, in accordance with an illustrative embodiment.

FIG. 8 is a flowchart illustrating the operation of estimating power consumption within a multi-core microprocessor chip at a high level, in accordance with an illustrative embodiment. The operation of FIG. 8 may be implemented in a microprocessor, such as microprocessor 302 of FIG. 3. The operation begins when a set of activities to be monitored for a unit is received from an authorized user (step 802). A value for each activity of the set of activities is stored in an assigned counter of a set of counters, forming a set of stored values, wherein the value comprises the count multiplied by a weight factor specific to the activity (step 804). The set of activities are grouped into subsets (step 806). The subgroups correspond to where the activity occurs, such as L2 cache activity subset, core activity subset, and L3 cache activity subset. The stored values corresponding to each activity in the subset of activities are summed to form a total value for the subset (step 808). The total value for each subset is multiplied by a factor that corresponds to the subset to form a scaled value for each subset (step 810). For example, L2 activity scaling value 420 corresponds to L2 activity counter 430 in FIG. 4. The power manager receives a power usage value comprising a summation of the scaled value of each subset (step 812). The power manager adjusts the operational parameters of the unit based on a comparison of the power usage value to a predetermined threshold value (step 814) and the operation ends.

Figure 9:
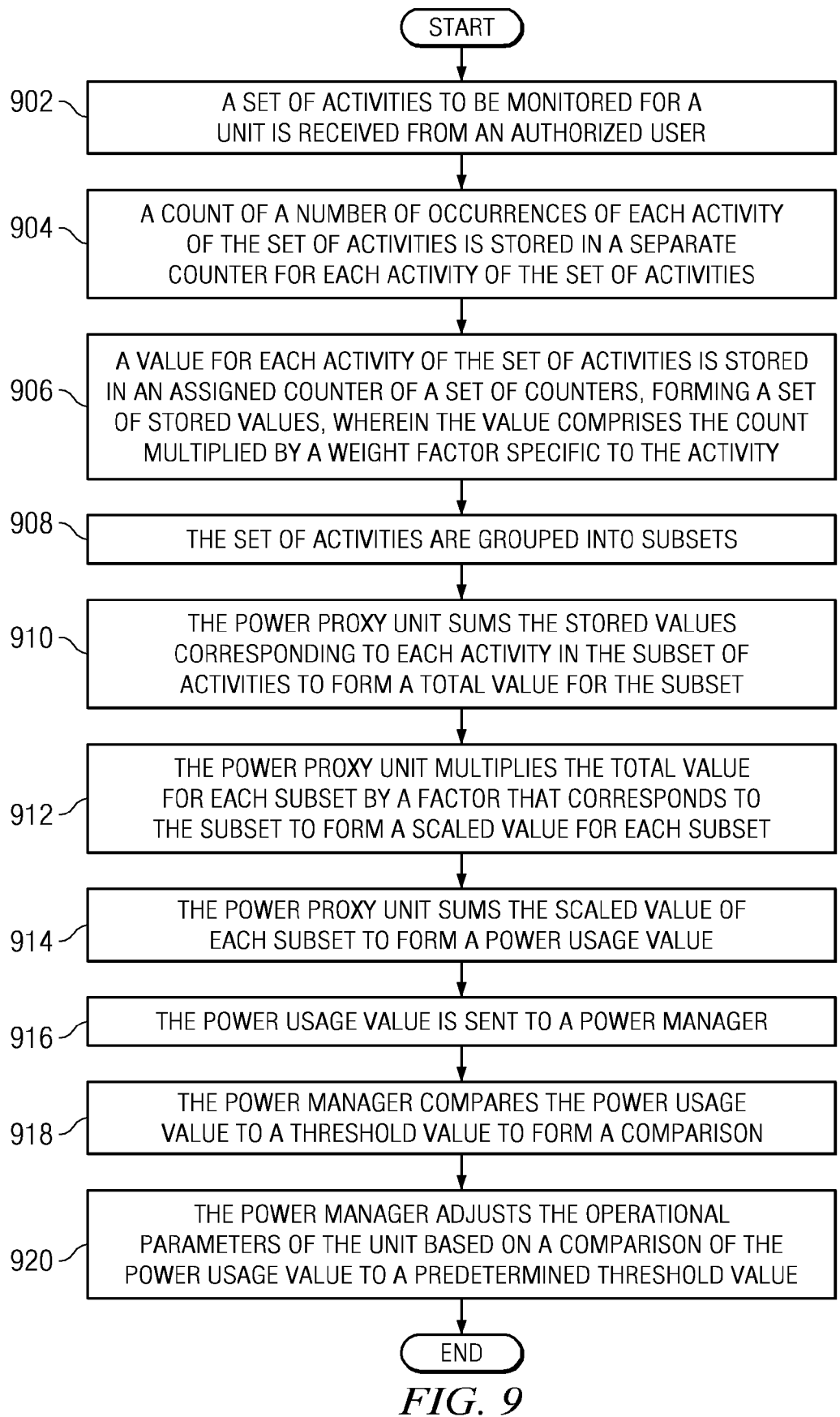
FIG. 9 is a flowchart illustrating the operation of estimating power consumption within a multi-core microprocessor chip in detail, in accordance with an illustrative embodiment.

FIG. 9 is a flowchart illustrating the operation of estimating power consumption within a multi-core microprocessor chip in detail, in accordance with an illustrative embodiment. The operation of FIG. 9 may be implemented in a microprocessor, such as microprocessor 302 of FIG. 3. The operation begins when a set of activities to be monitored for a unit is received from an authorized user (step 902). The unit can be a chip or a thread. Some examples of activity are execution regfile access, instructions dispatched, instructions completed, execution pipe issue types, L2 cache reads and writes, and L3 cache reads and writes. Additionally, an authorized user can also assign what counters are to be used to monitor the selected activities. The authorized user makes these selections through the use of a programmable interface. The authorized user can also assign the weight factors to the activities through the use of this interface.

A count of a number of occurrences of each activity of the set of activities is stored in a separate counter for each activity of the set of activities (step 904). A value for each activity of the set of activities is stored in an assigned counter of a set of counters, forming a set of stored values, wherein the value comprises the count multiplied by a weight factor specific to the activity (step 906). The weight factor is determined based on pre-silicon and after silicon power modeling. Each power proxy units manages a set of counters. The power proxy unit collects the stored values for the set of counters the power proxy units manages in parallel. Further, a single power manager manages a plurality of power proxy units. Each power proxy has one or more units assigned that the power proxy unit monitors. The power proxy units may then collect values in parallel or independently of each other. Further the collection period is configurable for each power proxy unit and each power proxy unit may collect the stored values for different periods than every other power proxy managed by a power manager.

The set of activities are grouped into subsets (step 908). The power proxy unit sums the stored values corresponding to each activity in the subset of activities to form a total value for the subset (step 910). The power proxy unit multiplies the total value for each subset by a factor that corresponds to the subset to form a scaled value for each subset (step 912). The power proxy unit sums the scaled value of each subset to form a power usage value (step 914). The power usage value is sent to a power manager (step 916). The power manager compares the power usage value to a threshold value to form a comparison (step 918). The power manager adjusts the operational parameters of the unit based on a comparison of the power usage value to a predetermined threshold value (step 920) and the operation ends.

The invention can take the form of an entirely hardware embodiment or an embodiment containing both hardware and software elements. In a preferred embodiment, the invention is implemented in hardware and software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing power consumption within a multi-core microprocessor chip, the computer-implemented method comprising:
receiving, from an authorized user, a set of activities selected to be monitored for a unit wherein the user assigns a specific counter of a first set of counters for a specific activity of the set of activities;
storing a value for each activity of the set of activities in an assigned counter of the first set of counters, forming a set of stored values, wherein the value comprises a count multiplied by a weight factor specific to the activity, wherein the weight factor is based on a pre-silicon and after-silicon power modeling;
grouping the set of activities into subsets;
summing the stored values corresponding to each activity in each of the subsets to reach a total value for each of the subsets;
multiplying the total value of each of the subsets by factor corresponding to the subset to form a scaled value for each of the subsets;
receiving, at a power manager, a power usage value comprising a summation of the scaled value of each of the subsets; and
adjusting, by the power manager, the operational parameters of the unit based on a comparison of the power usage value to a predetermined threshold value.

2. The computer-implemented method of claim 1, further comprising:
storing a count of a number of occurrences of each activity of the set of activities in an assigned counter of a second set of counters for each activity of the set of activities.

3. The computer-implemented method of claim 1, further comprising:
collecting, by a power proxy unit, the set of stored values; and
responsive to collecting the set of stored values, setting, by the power proxy unit, corresponding counters to zero;
wherein the power proxy unit is part of a chiplet comprising the power proxy unit, a core, a L2 cache, and a L3 cache.

4. The computer-implemented method of claim 3, wherein the power proxy unit collects the set of stored values in parallel.

5. The computer-implemented method of claim 3, wherein the power proxy unit collects the set of stored values periodically.

6. The computer-implemented method of claim 3, further comprising:
managing, by the power manager, a plurality of power proxy units, wherein each power proxy unit monitors an assigned unit.

7. The computer-implemented method of claim 6, wherein each power proxy unit of the plurality of power proxy units collects the set of stored values for the assigned unit independently of the other power proxy units of the plurality of power proxy units.

8. The computer-implemented method of claim 1, further comprising:
sending the power usage value to the power manager.

9. The computer-implemented method of claim 1, wherein the unit is a thread.

10. A system for managing power consumption within a multi-core microprocessor chip, the system comprising:
a first set of counters, wherein an assigned counter of the first set of counters stores a value for an activity of a set of activities selected to be monitored, forming a set of stored values, wherein the value comprises a count multiplied by a weight factor specific to the activity, wherein the weight factor is based on a pre-silicon and after-silicon power modeling; and
a power manager including memory, wherein the power manager manages the first set of counters, wherein managing the first set of counters comprises a unit receiving, from an authorized user, the set of activities to be monitored for the unit, groups the set of activities into subsets, sums the stored values corresponding to each activity in each of the subsets to reach a total value for each of the subsets, multiplies the total value of each of the subsets by factor corresponding to the subset to form a scaled value for each of the subsets, and sums the scaled value of each of the subsets to form a power usage value, and adjusts the operational parameters of the unit based on a comparison of the power usage value to a pre-determined threshold value, wherein the user assigns a specific counter of the first set of counters for a specific activity of the set of activities via the memory.

11. The system of claim 10, further comprising:
a second set of counters, wherein a count of a number of occurrences of each activity of the set of activities is stored in a separate counter of the second set of counters for each activity of the set of activities.

12. The system of claim 10, wherein a power proxy unit that is part of a chiplet comprising the power proxy unit, a core, a L2 cache, and a L3 cache collects the set of stored values; and
wherein, responsive to collecting the set of stored values, the power proxy unit sets corresponding counters to zero.

13. The system of claim 12, wherein the power proxy unit collects the set of stored values in parallel.

14. The system of claim 12, wherein the power proxy unit collects the set of stored values periodically.

15. The system of claim 12, wherein the power manager manages a plurality of power proxy units and wherein each power proxy unit monitors an assigned unit.

16. The system of claim 15, wherein each power proxy unit of the plurality of power proxy units collects the set of stored values for the assigned unit independently of the other power proxy units of the plurality of power proxy units.

17. The system of claim 10, wherein a power proxy unit sends the power usage value to the power manager.

18. The system of claim 10, wherein the unit is a thread.

19. A computer program product comprising:
a computer non-transitory storage medium including computer usable program code, the code being executed by a computer for managing power consumption within a multi-core microprocessor chip, comprising:
computer usable program code for receiving, from an authorized user, a set of activities selected to be monitored for a unit, wherein the user assigns a specific counter of a first set of counters for a specific activity of the set of activities;
computer usable program code for storing a value for each activity of the set of activities in an assigned counter of the first set of counters, forming a set of stored values, wherein the value comprises a count multiplied by a weight factor specific to the activity, wherein the weight factor is based on a pre-silicon and after-silicon power modeling;

computer usable program code for grouping the set of activities into subsets;

computer usable program code for summing the stored values corresponding to each activity in each of the subsets to reach a total value for each of the subsets;

computer usable program code for multiplying the total value of each of the subsets by factor corresponding to the subset to form a scaled value for each of the subsets;

computer usable program code for receiving, at a power manager, a power usage value comprising a summation of the scaled value of each of the subsets; and computer usable program code for adjusting, by the power manager, the operational parameters of the unit based on a comparison of the power usage value to a predetermined threshold value.

20. The computer program product of claim 19, further comprising:

computer usable program code for storing a count of a number of occurrences of each activity of the set of activities in an assigned counter of a second set of counters for each activity of the set of activities;

computer usable program code for collecting, by a power proxy unit, the set of stored values;

computer usable program code for, responsive to collecting the set of stored values, setting corresponding counters to zero; and computer usable program code for sending the power usage value to the power manager.

* * * * *